UNITED STATES PATENT OFFICE.

HERBERT LANG, OF TACOMA, WASHINGTON.

PROCESS OF SMELTING ORES.

SPECIFICATION forming part of Letters Patent No. 519,129, dated May 1, 1894.

Application filed September 9, 1893. Serial No. 485,164. (No specimens.)

*To all whom it may concern:*

Be it known that I, HERBERT LANG, of Tacoma, in the county of Pierce, State of Washington, have invented a new and Improved Process of Smelting Ores, of which the following is a full, clear, and exact description.

The object of the invention is to provide a new and improved process for the rapid and economical smelting of such ores of gold, silver, copper, nickel, cobalt and other valuable metals as will, when melted in a furnace, without previous roasting, produce a matte or speiss. The process consists in feeding into a blast furnace, as a part of the charge, molten matte or speiss, so that the descending stream of liquid material shall come in contact with the currents of air and other gases from below, and be decomposed thereby. To carry out this process I withdraw the melted matte or speiss from the bottom of the furnace, or of a neighboring furnace, and elevating it in pots to the feed-floor, I pour it in a thin stream upon the ore charge already in the shaft of the furnace, whereby the liquid is scattered into particles or globules, and runs downward through the interstices of the ore, and comes in contact with the ascending currents of air and other gaseous substances arising from the region of the tuyeres, when a mutual decomposition sets in, the sulphur, arsenic and antimony being burned off and the base metals being converted into oxides, which tend to unite with the silica of the charge and produce slag. This decomposition takes place to a greater or less extent each time the matte or speiss is poured upon the charge, the effect being to diminish the amount while increasing the richness of the matte or speiss in valuable metals. At the same time, much heat is produced by the chemical action of the gases on the hot liquid, which added to the sensible heat of the melted matter, assists very materially in bringing about the necessary smelting reactions, thus economizing fuel.

The extent of the decomposition brought about, and consequently the effectiveness of the process, will depend upon the oxidizing power of the gases, and this in turn upon the volume of blast, coarseness of the charge, and character of the fuel. For the proper and advantageous working of the process it is necessary that the solid materials of the charge should be kept hot, in order that the matte or speiss falling thereon should not be cooled and solidified into masses along with the ore. To keep the top of the charge sufficiently hot, it is necessary to feed the furnace low, whereby the heat approaches the upper surface of the ore and prevents the solidification of the matte or speiss when it is poured in. It is also important to use a charge of coarse materials, in order to allow the matte or speiss to find its way downward among the interstices. Some matte, unburned, taking the valuable metals, reaches the hearth, where it acts powerfully in removing obstructions. I recognize the fact that the common blast furnace may be so charged and blown that a considerable proportion of unconsumed oxygen may be driven quite through the charge, in a manner to make my process very effective; but I do not limit myself to the use of any specific construction of furnace or accessory apparatus, by means of which my process may be carried on, for I am aware that many modifications in such constructions may be made, and many different forms of such be used without departing from the process and the spirit of my invention. Nor do I limit myself to the decomposing effects of the oxygen of the air-blast, but seek to cover in my claim the useful effects of any and all other gases which may be made to react beneficially upon melted matte or speiss for the purpose and in the manner described. Again, I do not limit my claim to the use of furnaces in which a cold air-blast is used; but include the use of heated blasts in the manner and for the purpose described.

Having thus fully described my invention, I claim as new and desire to secure by Letters Patent—

The herein described process for smelting ores of gold, silver, copper, cobalt, nickel, and other valuable metals, consisting in smelting the ores to a matte or speiss, melting the matte or speiss, transferring it to the top of a suitable furnace in which smelting is going on, and pouring the matte or speiss into the furnace so as to bring it in contact with the ore and gases in the furnace, substantially as and for the purpose described.

HERBERT LANG.

Witnesses:
JOHN TURNER,
A. J. HOLMES.